Sept. 9, 1969   R. S. DOUGLAS   3,465,578
CHASSIS DYNAMOMETER

Filed July 5, 1966   2 Sheets-Sheet 1

INVENTOR
ROBERT S. DOUGLAS
BY Blair, Freeman & Molinare
ATTORNEYS

INVENTOR
ROBERT S. DOUGLAS
BY Bair, Freeman & Molinare
ATTORNEYS

United States Patent Office 3,465,578
Patented Sept. 9, 1969

3,465,578
CHASSIS DYNAMOMETER
Robert Stoddart Douglas, Parsonage Farm Mottram,
Hyde, Cheshire, England
Filed July 5, 1966, Ser. No. 562,817
Int. Cl. G01m *15/00;* G01l *3/18*
U.S. Cl. 73—117                                    5 Claims

ABSTRACT OF THE DISCLOSURE

The invention relates to an improved chassis dynamometer or test bed for determining the efficiency of a vehicle engine by evaluating the brake horsepower produced at a particular speed. In the invention the speed of the vehicle under test is controlled at a pre-selected constant speed in order to provide a measurement of power or driving force at the constant speed. This is achieved by the provision of test bed means drivingly coupled to the driving wheels of the vehicle and sensing means electronically connected to a speed control unit such that when the test bed is in use and a predetermined speed of vehicle wheel rotation is exceeded, electrical impulses are generated to actuate an eddy current brake for retarding the vehicle wheels and returning them to the predetermined speed, thus enabling the torque acting on the brake to be measured and the engine brake horsepower to be evaluated.

---

Chassis dynamometers or test beds are known for measuring the brake horsepower of a vehicle at any predetermined speed. Some known test beds include the use of a water brake, but it has been found that these test beds have the disadvantage that the brake does not react rapidly to adjustment by virtue of the fact that the brake does not become operative in its adjusted condition until the amount of water in the brake has varied to meet the conditions demanded by the adjustment made. It is advantageous that the time taken to evaluate the brake horsepower should be short as possible in order to avoid damage to the tires and engine of a vehicle.

One object of the present invention is to provide a chassis dynamometer or vehicle test bed in which the above-mentioned disadvantages are removed or at least substantially reduced and which will give a substantially instantaneous indication of the brake horsepower.

The invention will now be described further, by way of example only, with reference to the accompanying drawings, in which.

Figure 1:
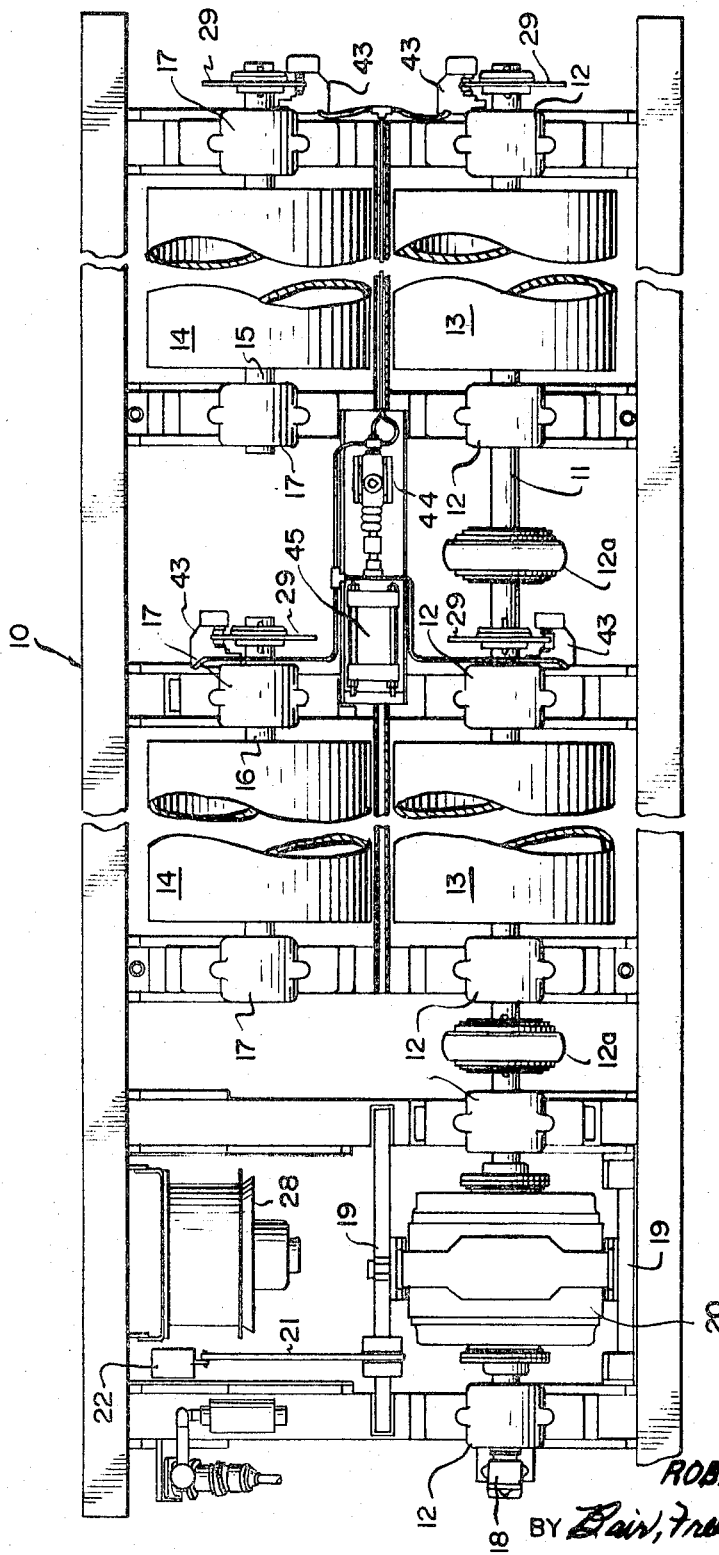
FIG. 1 is a plan of a vehicle test bed constructed in accordance with the invention.

The vehicle test bed as shown comprises a framework 10 having a shaft 11 mounted thereon in bearings 12. As shown, the shaft may be in sections which are connected by flexible couplings 12a. Rigidly mounted for rotation on the shaft 11 are two rollers 13. Two corresponding idler rollers 14 are rotatably mounted on the framework 10 by shafts 15 and 16 journaled in bearings 17. Also connected to the shaft 11 to be driven thereby is a tachometer 18.

A part of the shaft 11, remote from the rollers 13, passes through an eddy current brake 20, which is resiliently mounted on the framework 10 by spring seating means generally indicated at 19 which allows the brake to turn proportionally to the braking force exerted by it. A torque arm 21 is attached at one end to one of the seating means 19 and through it to the casing of the brake 20 to move proportionately to turning of the brake. The other end of arm 21 is attached to the control slide of a potentiometer 22. The brake 20 may be cooled by one or more cooling fans as shown at 28.

Figure 2:
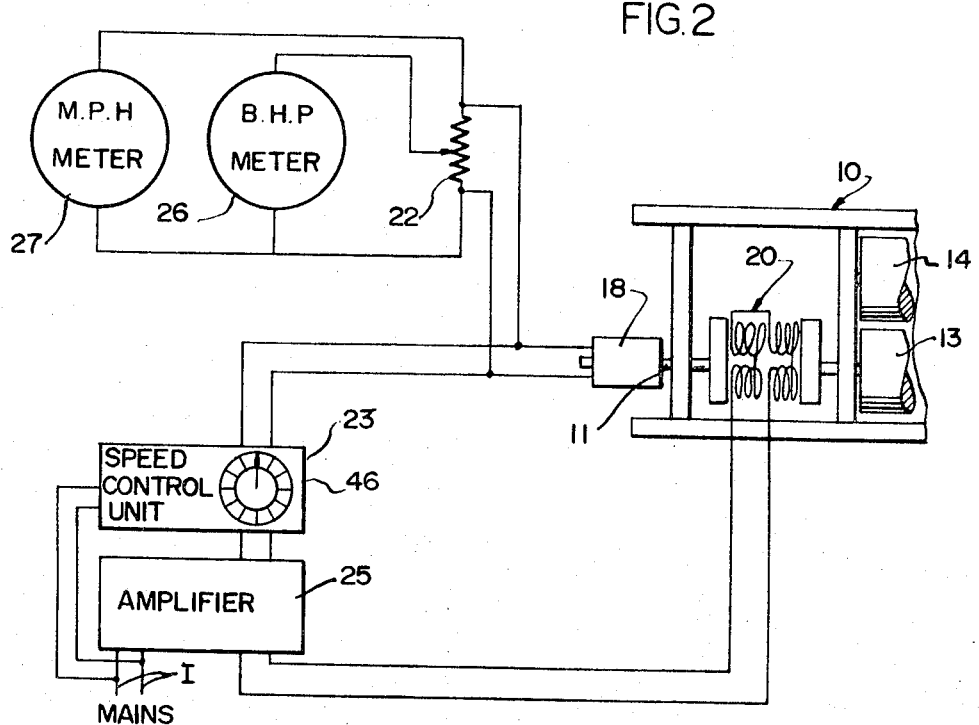
FIG. 2 is a block circuit diagram for the test bed of FIG. 1.

As shown in FIG. 2 the potentiometer 22 is connected to the tachometer 18 which is an A.C. generator. The potentiometer output voltage from the control slide thereof is supplied to a brake horsepower meter 26 which will indicate the product of speed and torque. A second meter 27 may be connected directly to the tachometer, as shown, to indicate speed in terms of miles per hour or other desired designation.

The tachometer 18 also supplies a signal voltage to a speed control unit 23 which is a voltage comparator circuit. A second voltage signal which may be manually adjusted proportionally to a desired testing speed as described hereinafter is supplied to the unit 23. When the tachometer signal voltage exceeds the second signal voltage, the difference is amplified by an amplifier 25 and fed to the eddy current brake 20 to brake the shaft 11.

Figure 3:
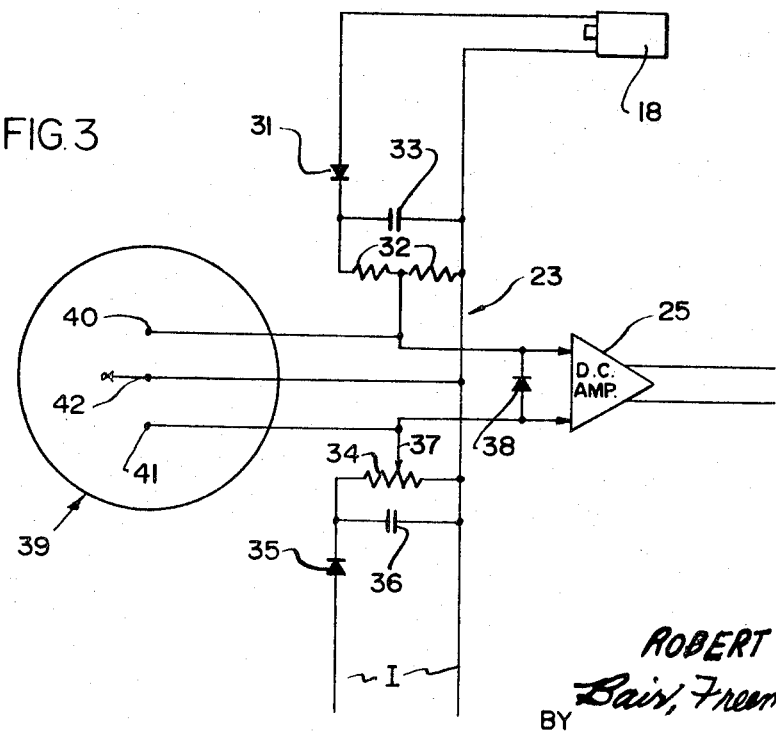
FIG. 3 is a circuit diagram of a voltage comparator circuit.

One simple form of control circuit 23 is illustrated in FIG. 3, although it will be understood that any circuit which will produce an output proportional to the differential between the tachometer signal voltage and the second voltage signal could be used. As shown in FIG. 3, the tachometer 18 is connected through a rectifier 31 across a pair of voltage divider resistors 32. A capacitor 33 preferably shunts the resistors 32 for filtering.

The second voltage signal is provided by a potentiometer 34 connected through a rectifier 35 to a voltage source such as the input source I. The potentiometer is preferably shunted by a filter capacitor 36.

The mix point between resistors 32 and the control slide 37 of the potentiometer 34 is connected to the input terminals of the amplifier 25. A rectifier 38 connects the input terminals and is poled to shunt the input voltage to the amplifier when the voltage at control slide 37 exceeds the voltage at voltage divider 32.

To provide for manual control of the brake operation over-ruling the automatic control, a two-way switch 39 is provided. Outer contacts 40 and 41 of the switch are connected respectively to the voltage divider 32 and the control slide 37 and a movable contact 42 is connected to a common side of the voltage divider and potentiometer circuits. When contact 42 engages contact 40, the tachometer signal will be shunted out and the brake 20 will be released. Similarly, when contact 42 engages contact 41, the potentiometer signal will be shunted out and the brake will be energized.

Preferably to hold the idlers 13 and 14 stationary to facilitate driving a vehicle onto the test bed, a brake disc 29 is connected to each of the shafts 11, 15 and 16. The discs 29 are adapted to be gripped by hydraulically actuated shoe units 43 supplied by a master cylinder 44. The master cylinder 44 is actuated by a fluid power cylinder 45 which may be controlled manually from a remote point.

In operation a vehicle is driven onto the test bed with the brake discs 29 locked so that the driving wheels become located on the rollers 13 and 14 and the discs 29 are then released. The control slide 37 of the potentiometer 34 is then adjusted to produce a voltage proportional to the desired testing speed. A calibrated dial 46 may be provided on the control unit 23 for this purpose.

The vehicle engine is started and full throttle setting is applied, causing the rollers 13 and 14 to rotate. By rotation of the rollers, the tachometer 18 transmits a signal to the control unit 23 which is proportional to the roller speed. This signal is compared with the selected voltage already existing in the control unit 23 from the potentiometer 34. When the signal from the tachometer 18 exceeds the selected voltage, a differential signal is transmitted through the amplifier 25 to the eddy current brake 20 to actuate the same. The speed of the vehicle wheels is reduced under braking action and thus the signal from the tachometer 18 is reduced, which when recompared with the selected voltage will produce a negative differential signal, thus causing the brake 20 to be released.

It will be appreciated that the reaction of the control unit 23 to changes in speed is instantaneous and that the vehicle wheels will very rapidly settle down to a constant speed.

At a selected constant speed, determined by the calibrated rheostat 34, the casing of the brake 20 tends to rotate due to torque reaction, and the torque arm 21 moves the control slide of the potentiometer 22 thus varying the potential difference across the potentiometer 22. This potential difference is indicated on the brake horsepower or torque meter 26.

It will be appreciated that a load is supplied to the vehicle wheels only when the brake 20 is applied. The advantage of this feature lies in the fact that, under no load, the wheels will "run up" in a very short time to the pre-determined speed. The process of taking necessary readings is therefore very rapid, thus avoiding the risk of damaging the engine or tires of the vehicle.

While one embodiment of the invention has been shown and described in detail, it will be understood that this is illustrative only and is not to be taken as a definition of the scope of the invention, reference being had for this purpose to the appended claims.

What is claimed is:

1. A chasis dynamometer in which the speed of the vehicle is controlled at a pre-selected speed to obtain a measurement of power at constant speed comprising a rotatable shaft, roller means drivingly connected to the wheels of the vehicle to drive said shaft, tachometer means driven by the shaft to produce a first signal proportional to the speed of the shaft, manually settable means for producing a second signal proportional to a desired testing speed, a speed control unit having signal comparing means connected to both said tachometer means and said manually settable means for producing a differential signal proportional to the difference between said first and second signals, an eddy current brake operatively connected to said roller means for limiting the speed of rotation thereof to a pre-selected constant vehicle speed and differential signal amplifying means connected between said signal comparing means and said eddy current brake for controlling said eddy current brake in accordance with said differential signal to enable measurement of the vehicle power at a constant pre-selected speed.

2. The chassis dynamometer of claim 1 including means produce a fourth signal proportional to the product of the first signal and the braking force exerted by the brake, and means to indicate the value of the fourth signal.

3. The chassis dynamometer of claim 2 including a mechanical brake to hold the shaft and the first named means stationary.

4. The chassis dynamometer of claim 1 in which the tachometer means is an electric generator producing a voltage proportional to the shaft speeds, the second signal producing means is a variable voltage source, the signal comparing means responds to said voltages to produce a voltage proportional to the difference between them, and the brake is an electric brake controlled by the last named voltage.

5. The chassis dynamometer of claim 4 including a potentiometer connected to the generator to be energized thereby, means connecting the potentiometer to the brake to adjust the potentiometer proportionally to the braking force exerted by the brake, and indicating means connected to the potentiometer and responsive to its output voltage.

References Cited

UNITED STATES PATENTS

| | | | |
|---|---|---|---|
| 2,430,310 | 11/1947 | Stratton | 73—133 X |
| 2,803,132 | 8/1957 | Clayton | 73—117 |
| 3,057,192 | 10/1962 | Huffman et al. | 73—117 |
| 3,289,471 | 12/1966 | Maxwell | 73—117 |

OTHER REFERENCES

Judge, A. W., The Testing of High Speed Internal Combustion Engines. Fourth edition revised. London. Chapman and Hall Ltd. 1955. pp. 177, 178, and 203.

RICHARD C. QUEISSER, Primary Examiner

JERRY W. MYRACLE, Assistant Examiner

U.S. Cl. X.R.

73—134